Oct. 26, 1965

C. A. WHITNEY ETAL 3,213,671

NON-CONTACTING FLUID GAGE

Filed July 11, 1963

INVENTORS
Charles A. Whitney
Allen R. Hollister
Gilbert H. Tatro

BY Rockwell & De Lio
ATTORNEYS

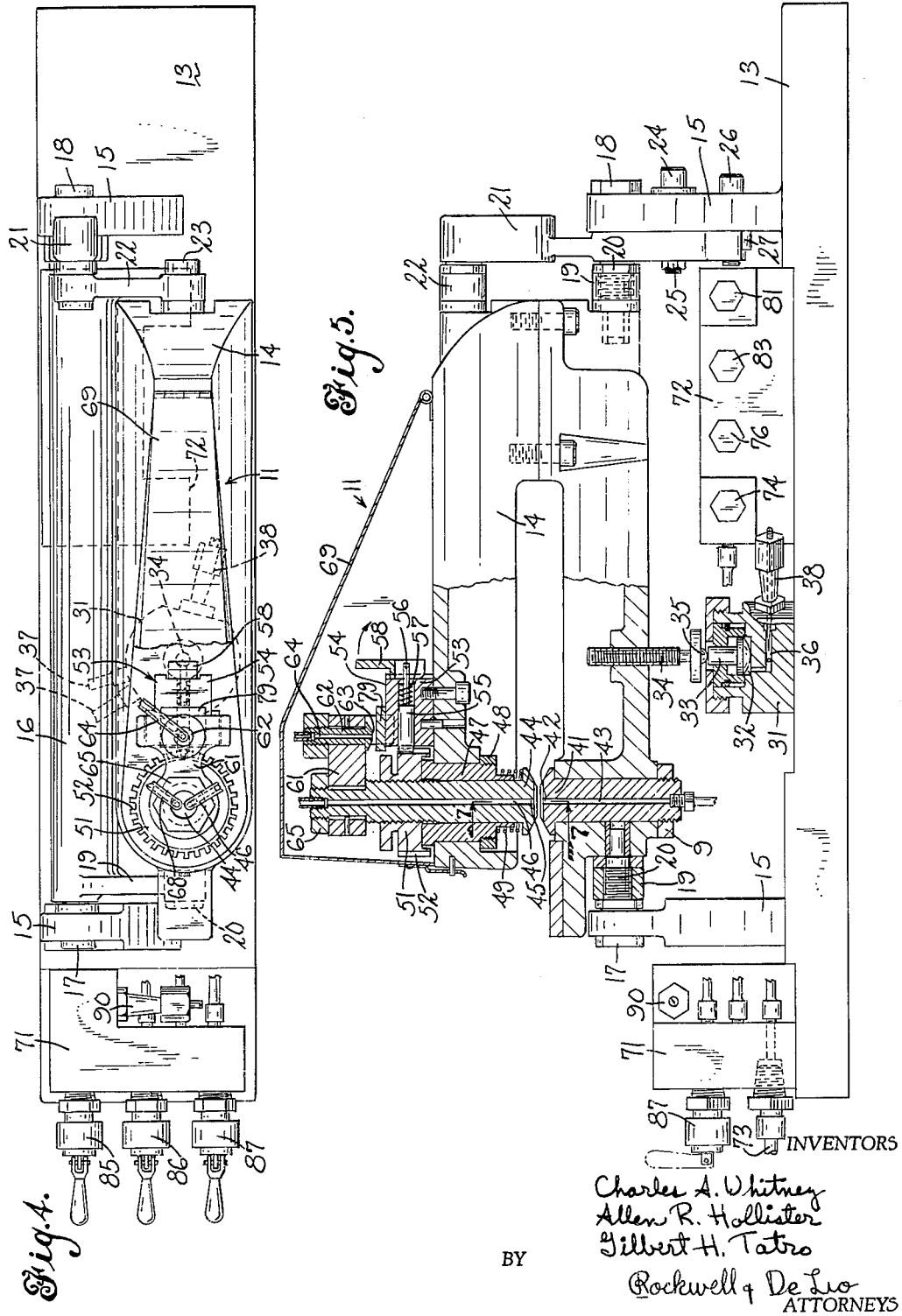

Oct. 26, 1965

C. A. WHITNEY ETAL 3,213,671

NON-CONTACTING FLUID GAGE

Filed July 11, 1963

INVENTORS
Charles A. Whitney
Allen R. Hollister
Gilbert H. Tatro
BY
Rockwell & De Lio
ATTORNEYS United States Patent Office 3,213,671
Patented Oct. 26, 1965

3,213,671
NON-CONTACTING FLUID GAGE
Charles A. Whitney, Bloomfield, Allen R. Hollister, East Hartford, and Gilbert H. Tatro, Granby, Conn., assignors to Pratt & Whitney Inc., a corporation of Delaware
Filed July 11, 1963, Ser. No. 294,292
21 Claims. (Cl. 73—37.7)

This invention relates generally to a non-contacting fluid gage particularly of the type for use in the continuous gaging of strip. While not so limited, the invention is especially adaptable for use on or in connection with a rolling mill which feeds or delivers strip continuously and at a high speed. Because of the high speed and continuous operation, it is desirable that a constant check be kept on the thickness of the strip, but it is highly undesirable to utilize any measuring instrument which comes in contact with the strip. Contacting instruments usually require a slow-down of the mill and may cause damage to the strip. Furthermore, if the strip is paper or thin plastic or extremely thin metal, a contacting gage or measuring instrument might cause buckling of the strip or otherwise interfere with the operation of the mill.

When strip is delivered from a mill, it is quite unusual for it to travel in a perfectly straight path unless heavy gage sheets are being rolled. In the usual situation, strip will travel in a curved path depending upon the material being rolled, its gage, the nip pressure of the mill rolls, the speed of delivery and the like. Since all these factors may change or fluctuate during a rolling operation, accurate, continuous gaging has heretofore been found quite difficult. With this problem in mind, the instant invention was developed.

Accordingly, it is an object of this invention to provide an improved gage which can be used to accurately and continuously gage strip as it is delivered from a mill.

Another object of this invention is to provide a fluid gage which may accurately and continuously gage strip regardless of the fluctuations of the strip in the plane of rolling.

Still another object of the invention is to provide means for balancing the gaging device with relation to continuously moving strip while the strip is proximate to the gaging device.

A further object of the invention is to provide automatic means to maintain the gage in proper relation to the strip, regardless of strip fluctuation.

A still further object of the invention is to provide simplified means for adjusting a gaging device to receive and gage strip of different size without requiring access to the gaging means proximate to the strip.

Still other objects and advantages of the invention will in part be obvious and will in part be apparent from the specification.

Generally speaking, in accordance with the invention, a device carrying opposed gaging nozzles is mounted to a mill so that strip delivered from the mill will pass between gaging nozzles. The gaging circuitry is such that the opposed nozzles can be used to indicate the thickness of the strip passing between the nozzles and can be instantaneously switched over to indicate the balance (location) of the strip between the nozzles. By means of the latter switch-over circuit, the gage can be checked for optimum operation while the strip is passing between the gaging nozzles. Optimum operation occurs when the strip is positioned substantially equidistant from the opposed gaging nozzles.

A nozzle adjacent one of the gaging nozzles is also provided to automatically maintain the gaging nozzles in balance regardless of the fluctuation of the strip. The balancing nozzle controls the movement of a piston or diaphragm which can raise or lower the gaging device responsive to the change in back pressure at the balancing nozzle. An additional nozzle is also provided to adjust the distance between the gaging nozzles utilizing gage blocks of known size which bear a pre-selected relation to the strip to be gaged. In adjusting the distance between the gaging nozzles, actual physical access need not be had to the nozzles.

The invention accordingly comprises the features of construction, combination of elements, and arrangement of parts which will be exemplified in the construction hereinafter set forth, and the scope of the invention will be indicated in the claims.

For a fuller understanding of the invention, reference is had to the following description taken in connection with the accompanying drawings, in which:

FIG. 4 is a top plan view of the preferred embodiment of the invention with certain portions broken away for the sake of clarity;

FIG. 5 is a left side elevational view, partly in section, of the preferred embodiment of the invention;

Figure 3:
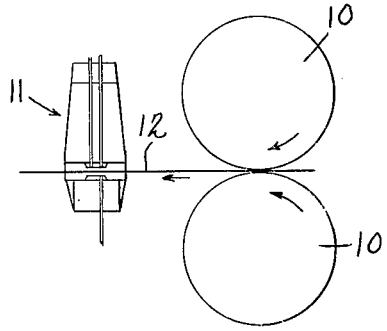
FIG. 3 is a schematic representation of the invention mounted with respect to the rolls of a mill.

Referring first to FIG. 3, the proximity between the gage and the mill is indicated schematically. A gaging head, indicated generally at 11, is shown horizontally displaced from the mill rolls 10. Mill rolls 10 may form the last rolling station of the mill so that gaging head 11 gages the strip 12 which has been rolled to its final size or, the gaging head, which does not interfere with the rolling operation, may be placed between consecutive sets of rolls to gage the size of the strip after some intermediate rolling operation. As indicated, rolls 10 normally rotate in the direction shown by the arrows and strip 12 is delivered from the mill in the direction indicated. The gaging head is provided with several gaging nozzles which will be hereafter described in greater detail. As shown, the spaced-apart gaging nozzles are disposed on opposite sides of strip 12 and the gaging head is horizontally displaced from the rolls. Also as shown, the gaging nozzles may be disposed in approximate horizontal alignment with the nip of the rolls. However, as will be more evident hereafter, the vertical position of the gaging head will be dependent upon the position taken by the strip as it leaves the rolls. This position will vary in accordance with the speed of rolling, the thickness of strip, the material being rolled, the nip pressure, etc.

Referring now to FIGS. 1, 2, 4 and 5, a preferred embodiment of the gaging apparatus consists primarily of a base 13 and the gaging head 11 rockably mounted on the base. The base can be of any suitable configuration and provided with mounting attachments so that it may be mounted to the frame of a rolling mill. The mounting will be such that the strip delivered from the mill passes between the nozzles and the gaging head.

Figure 2:
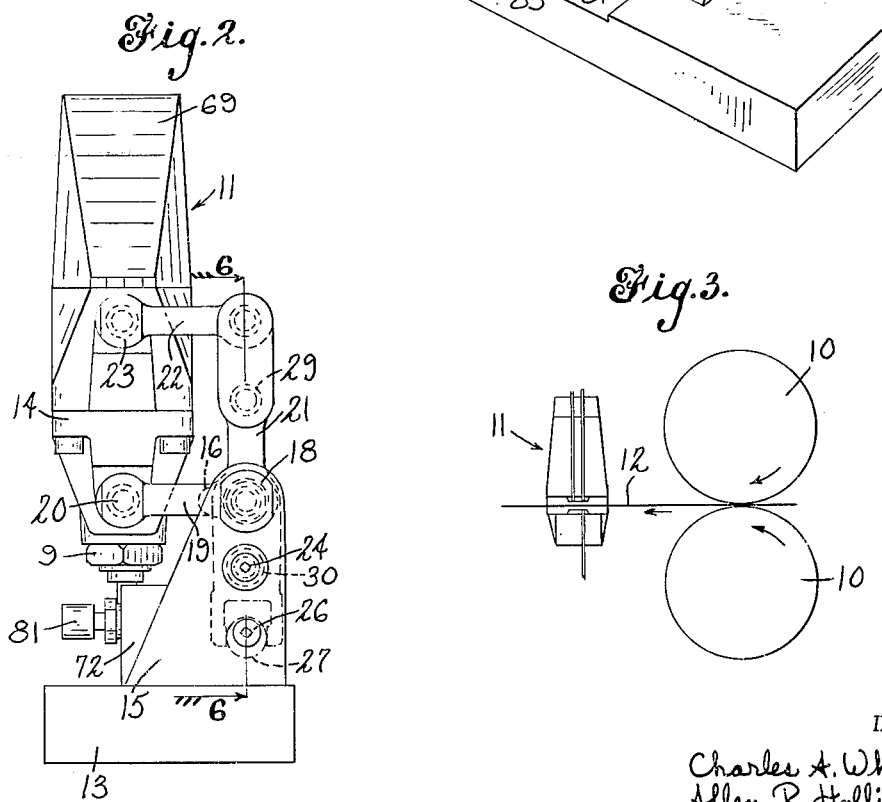
FIG. 2 is a rear elevational view of the structure embodying the invention of FIG. 1.
Figure 6:
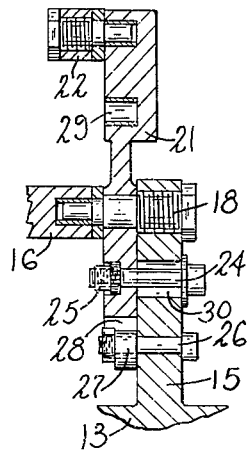
FIG. 6 is a partial sectional view taken along line 6—6 of FIG. 2.

A C-shaped member 14 is the main structural member of the gaging head. Member 14 is pivotally or rockably mounted with relation to base 13 in the following manner. A pair of longitudinally-spaced, vertical supports 15 are mounted on base 13. A rocker shaft 16 extends between the vertical supports and is pivoted to the front support 15 through a pin 17 and to the rear support through a pin 18 (FIG. 6). Extending outwardly from rocker shaft 16 are a pair of support arms 19 each of which is pivoted to C-shaped member 14 by means of pins 20. Thus, rocker shaft 16 may rotate with respect to the base 13 about pins 17 and 18, while C-shaped member 14 may pivot with respect to rocker shaft 16 about the axes of pins 20. An arm 21 is vertically affixed to the rear support and has an arm 22 pivoted at one end thereof to the upper end of arm 21. The other end of arm 22 is pivoted to C-shaped member 14 through a pin 23. As shown in FIG. 2, the raising and lowing of C-shaped member 14 will, through arms 22 and 19, maintain the C-shaped member 14 parallel to arm 21. However, arm 21 may be arcuately adjusted with respect to the vertical.

As heretofore described, arm 21 is pivoted to support 15 at pin 18. A locking bolt 24 extends freely through a clearance aperture 30 in support 15 and is provided with a nut 25 which bears against arm 21 when the bolt is tightened. A pin 26 is pivotally mounted through support 15 and a circular disc 27 is eccentrically mounted at the outer end of the pin. The lower end of arm 21 is provided with a rectangular cut-out 28 adapted to receive circular disc 27, the rectangular cut-out extending toward aperture 30 so that the arm will be urged to pivot arcuately about pin 18 only. By cooperation between circular disc 27 and the walls of the rectangular cut-out in arm 21, rotation of pin 26 adjusts the arcuate position of arm 21 when locking bolt 24 is released. When the arm has been adjusted to the desired position, the locking bolt will secure it in the adjusted position. Through arms 19 and 22, arcuate adjustment of the position of arm 21 will, in a similar manner, adjust the position of C-shaped member 14. However, through arms 19 and 22, the vertical movement of the C-shaped member will still maintain its parallelism to arm 21. The position of C-shaped member 14 with relation to arm 21 may also be adjusted, if desired, by changing the pivot connection of arm 22 to arm 21. As is evident in FIG. 6, an additional pivot connection 29 may be provided. The location of pivot connection 29 may be selected so that the gage head will pivot on the same center as the strip coming from the rolls.

Figure 1:
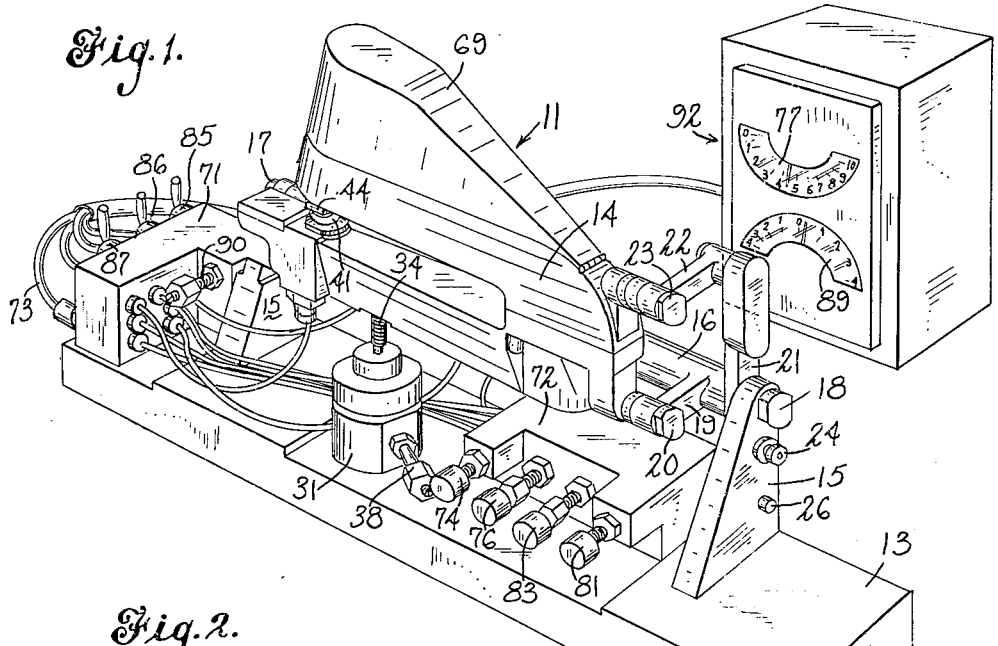
FIG. 1 is a left rear perspective view of a preferred embodiment of the invention including a right front perspective view of a cabinet having fluid gages mounted therein.

C-shaped member 14 may be raised and lowered in response to changes in fluid back pressure by means of a piston and cylinder arrangement best shown in FIGS. 1 and 5. A cylinder 31 is mounted on base 13 and is provided with a cylinder chamber 32 in which is positioned a piston 33 adapted for sliding vertical movement. A shaft of the piston extends outward of the cylinder and suitable packing is provided to prevent the escape of fluid from within the cylinder chamber. A screw 34 is adjustably secured in member 14 and has a head end 35 in contact with the outwardly extending end of piston 33. The weight of member 14, which is mounted for movement in a vertical direction as heretofore described, will urge the piston vertically downwardly within the cylinder chamber. It will thus be seen that fluid under pressure acting on the lower end of the piston will cause member 14 to be raised through screw 34 and the amount of lift provided will be proportional to the pressure of the fluid acting against the piston. Communicating with cylinder chamber 32 is a passage 36 which in turn communicates with a fluid supply line 37 (FIG. 4). An adjustable restriction valve 38 is carried by the cylinder and extends into the fluid supply line. The operation of the fluid system will be more fully explained in connection with FIG. 8.

Figure 7:
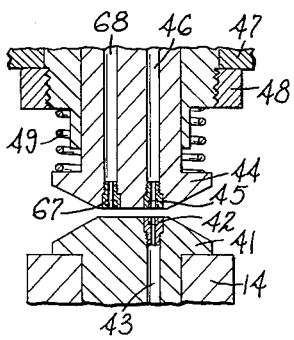
FIG. 7 is a partial sectional view taken along line 7—7 of FIG. 5.

Referring now to the nozzle assemblies which are best seen in FIGS. 5 and 7, a lower gage plug 41 is mounted near the outer end of the lower arm of C-shaped member 14. Lower gage plug 41 is provided with a lower gaging nozzle 42 having an aperture which communicates with a passage 43 extending axially through the lower gage plug. An upper gage plug 44 is disposed in axial alignmnet with the lower gage plug and is slidably carried in the upper arm of C-shaped member 14. A sleeve 47 is securely mounted in the upper arm of C-shaped member 14 and is locked in position by means of a threaded collar 48. Upper gage plug 44 is slidably mounted through sleeve 47 and a spring 49 encircling the gage plug acts between the outer end of the gage plug and the sleeve to urge the gage plug outwardly or toward lower gage plug 41. The central outer circumferential surface of upper gage plug 44 is threaded so as to threadedly engage an adjusting collar 51 which rests against the upper side of sleeve 47. It will thus be seen that rotation of adjusting sleeve 51 will cause upper gage plug 44 to be raised or lowered under the urging of spring 49. The outer circumferential surface of adjusting sleeve 51 is provided with a plurality of rachet teeth 52 to lock the sleeve in any adjusted position by means such as will hereafter be described. An upper gaging nozzle 45 is carried by the upper gage plug in axial alignment with the lower gaging nozzle and an aperture through the upper gaging nozzle communicates with a passage 46 extending through the upper gage plug. Passages 43 and 46 communicate with the fluid circuit shown in FIG. 8 and described hereafter.

A block 53 having an upper anvil surface 54 is mounted to the top side of the upper arm of C-shaped member 14 proximate to adjusting sleeve 51. A pin 55 is slidably mounted within the block for movement toward and from the adjusting sleeve, the outer end of the pin being adapted to mate with the ratchet teeth of the adjusting sleeve. A rod 56 extends from the inner end of pin 55 and is encircled by a spring 57 acting between the block and the pin. Rod 56 extends beyond one side of the block and is pivoted to a cam lever 58 which may be rotated in the direction shown by the arrow in FIG. 5. In the position of the pin and cam lever shown in FIG. 5, the pin is engaged with one of the ratchet teeth of adjusting sleeve 51 thereby preventing rotation of the adjusting sleeve. If it is desired to adjust upwardly or downwardly the position of upper gage plug 44, cam lever 58 may be rotated in the direction indicated by the arrow to withdraw pin 55 from engagement with one of the ratchet teeth 52, thereby permitting adjusting sleeve 51 to be manually rotated. When the desired position is attained, cam lever 58 will be rotated back to the position shown to lock the adjusting sleeve in the selected position.

The upper end of upper gage plug 44 carries an arm 61 extending over and parallel to anvil surface 54. Mounted to arm 61 over the anvil surface and parallel to upper gage plug 44 is a pilot gage plug 62 carrying a pilot nozzle 63 at the lower end thereof in communication with a passage 64 forming part of the fluid circuit of FIG. 8. Arm 61 is keyed to upper gage plug 44 and is also locked thereon by means of a threaded nut 65 to assure that the pilot gage plug travels with the upper gage plug during any vertical adjustment thereof.

Figure 8:
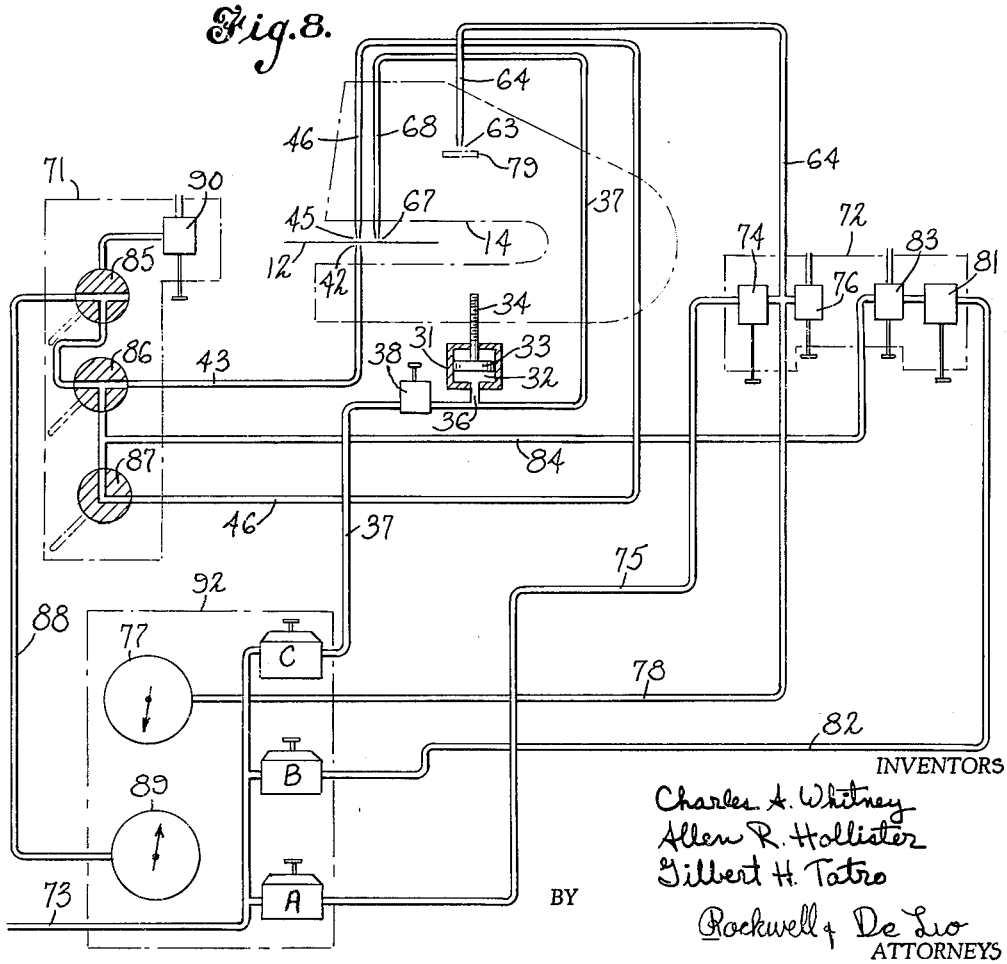
FIG. 8 is a schematic representation of the fluid circuitry embodying the invention.

As best seen in FIGS. 4 and 7, a servo nozzle 67 is also mounted in upper gage plug 44 at the outer face thereof, the servo nozzle communicating with a passage 68 extending through the gage plug and forming part of the fluid circuit of FIG. 8. The servo nozzle controls the servo system which maintains the balance of the gaging nozzles. The servo system will be described in detail in connection with FIG. 8. Although only one servo nozzle is shown, it should be noted that a pair of opposed servo nozzles can be provided for positively moving member 14 in either direction.

The gaging nozzles in the upper and lower gage plugs are disposed to preferably gage the strip when delivered from mill rolls positioned to the right of gaging head oriented as in FIG. 7. In other words, the strip would first pass between the gaging nozzles and then beneath the servo nozzles. If the gage is to be mounted so that the strip will pass from left to right, each gage plug would be rotated 180° to reverse the positions of the gaging nozzles shown in FIG. 7 but maintain them in axial alignment. For this reason, lower gage plug 41 is removably secured in member 14 by means of a threaded collar 9 and the upper gage plug is secured by the sleeve and collar heretofore described. If desired, keyways or pins (not shown) may be provided to assure alignment when the gage plugs are rotated. When the upper gage plug is rotated, arm 61 is also rotated and aligned by means of the keyway to maintain the position of the pilot nozzle over the anvil.

If desired, a hinged cover 69 may be mounted to the C-shaped member to protect the anvil and gage plugs from dust and to provide a neat and over-all integrated appearance. Also as shown, a control panel 71 and a valve block 72 may be carried by base 13 or may be provided at any suitable location depending upon the mounting of the gage to a mill and the accessibility thereof. The panel and block, 71 and 72, have been shown as being positioned on the base for the sake of simplicity. The panel and block carry fluid switches and valves respectively, forming part of the fluid circuit and will thus be described in detail in connection with FIG. 8.

The functioning of the apparatus heretofore set forth will now be described in connection with the circuitry shown in FIG. 8. Fluid, which in the usual situation would be air, under pressure is fed into the system through a line 73 and passes through three pressure regulators A, B and C. The outlet of regulator A is connected to an adjustable restriction valve 74 through a line 75. The outlet of the adjustable restriction valve 74 communicates with pilot nozzle 63 through passage 64. The outlet of valve 74 also communicates with an adjustable bleed valve 76 and with a back pressure indicating gage 77 through a line 78. Pilot nozzle 63 is used to measure, through the indicia on gage 77, the distance between lower gaging nozzle 42 and upper gaging nozzle 45 without requiring an actual physical measurement of the spacing between the nozzles.

Measurement would be made in the following manner. When the gage is first placed in operation, the gaging nozzles are positioned at a known, measured spacing. A gage block 79 of known size proportional to the actual known nozzle spacing, is placed on anvil surface 54 beneath pilot nozzle 63. The proximity of the surface of gage block 79 to pilot nozzle 63 will restrict the flow of fluid through passage 64, thereby creating a back-pressure in the line. Because of restriction 74, this back-pressure will be isolated from the regulated pressure in line 75 and will impress a reading on gage 77 through line 78. By means of bleed valve 76, the back-pressure may be adjusted by bleeding certain of the fluid to the atmosphere to zero gage 77. This zero position of gage 77 corresponds to a known spacing of the gaging nozzles. Valve 74 not only acts as a restriction to isolate the pressure on opposite sides of the valve, but also may be utilized to adjust the magnification of response of gage 77 to changes in back-pressure at the pilot nozzle. Thereafter, if it is desired to change the gaging nozzle spacing so that strip of different thicknesses may be gaged, gage block 79 will be changed for a different gage block having a different known size and adjusting sleeve 51 will be rotated to raise or lower upper gage plug 44 as required until the reading on gage 77 returns to the zero position or another position on the calibrated dial of the gage. The pilot nozzle may thus be utilized as its vertical position is set with relation to the upper gaging nozzle once the elements are assembled.

Once the spacing between gaging nozzles 42 and 45 has been set for the thickness of the particular strip to be gaged, a strip of that exact size may be placed between the gaging nozzles to now zero the measuring gage. The circuit for measuring will now be described. Regulated fluid from the outlet of regulator B is fed by means of a line 82 through an adjustable restriction valve 81 and an adjustable bleed valve 83. A line 84 carries the fluid under pressure from bleed valve 83 to control panel 71 wherein the line is interconnected to a plurality of other lines through two-position valves 85, 86 and 87. The normal gaging position of the valves carried by panel 71 is shown in FIG. 8. The fluid in line 84 is fed into passage 46 thorugh valve 87 thereby supplying fluid under pressure to upper gaging nozzle 45. The fluid under pressure in line 84 is also fed through valve 86 to passage 43, and thus to lower gaging nozzle 42. Since the fluid in line 84 is isolated from the fluid under pressure in line 82 by means of restriction valve 81, pressure in passages 43 and 46 will result from the back-pressure caused by the proximity of strip 12 to the upper and lower gaging nozzles. Through valve 85, a line 88 is also interconnected to line 84 and passages 43 and 46. Line 88 communicates with a pressure gage 89 which will indicate the back-pressure in the line. When the strip of known size is between the two gaging nozzles, back pressure in the line can be bled to atmosphere by means of bleed valve 83 to zero the reading on gage 89 for strip of exact size. If, thereafter, the size of the strip fluctuates, a change in back pressure will result and such change will show as a deflection, plus or minus, of the zero setting of gage 89. The gage may be calibrated to read the fluctuations directly in thousandths of an inch or other suitable unit of measurement. For different scales, the magnification of the fluctuation may be adjusted by means of restriction valve 81.

Small changes in the centering of strip 12 between the upper and lower gaging nozzles will not effect the reading since as the strip moves closer to one nozzle thereby increasing the back pressure at that nozzle, it moves an equal distance away from the other nozzle thereby lowering the back pressure at that nozzle. The resultant back pressure in line 88 will therefore remain the same. However, a large change in the position of strip 12 might cause it to contact one of the gaging nozzles, thereby introducing the possibility of damaging either the nozzle or the strip or both, and also reducing the accuracy of the gaging. Thus, while gage 89 may be zeroed by means of bleed valve 83 when the strip is static between the nozzles, the position of the gaging head with relation to the strip should also be adjusted while the strip is moving dynamically past the gaging nozzles. This is particularly necessary since the strip may not be flat during its travel but may bow or be deflected upwardly or downwardly depending upon the speed of rolling, nip pressure of the mill rolls and other variable factors.

Once the mill has been started and the strip is passing between the gaging nozzles, the circuitry shown may be utilized to adjust the position of the gaging head to space the strip approximately equidistant between the gaging nozzles. However, before this is done, the gaging head should be initially set up so that the gaging nozzles will be approximately equidistant from the strip when piston 33 is at approximately the mid point of cylinder chamber 32 so that travel in either direction will be provided for. The initial set up will be effected by adjusting the height of the gaging head with relation to the base through screw 34. In other words, screw 34 may be manually adjusted to raise or lower the gaging head as required for the particular set up.

Figure 9:
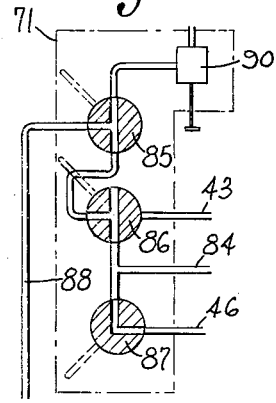
FIG. 9 is a partial view of a control panel section of the circuit of FIG. 8 with certain control levers in a switched position.

Thereafter, pressure gage 89 is utilized to indicate if the back pressure in each of the gaging nozzles is the same. To first check the back pressure at the upper gaging nozzle, valves 85 and 86 would be switched to the position shown in FIG. 9. This would isolate line 88 from passage 43 thus assuring that gage 89 would read the back pressure of the upper nozzle only. By switching valve 85, an adjustable bleed valve 90 would be tapped into line 88 to provide means to zero the deflection indicated on gage 89 to provide a reference point for adjusting the position of the gaging head. Then, valve 86 would be switched back to the FIG. 9 position while valve 87 would be switched to an off position (not shown), thereby isolating the upper gaging nozzle from line 88 but connecting the lower gaging nozzle only to gage 89. If a reading other than the zero reading is indicated on gage 89, then it would be known that the back pressure at one nozzle was different than the back pressure at the other nozzle. Restriction valve 38 would be manually adjusted to raise or lower the gaging head as required to bring the reading on gage 89 to a position halfway between the deflection shown for the lower gaging nozzle and the zero deflection for the upper gaging nozzle. Thereafter, bleed valve 90 can be adjusted to again zero the reading on gage 89 and by again switching the positions of valves 86 and 87, the back-pressure at the upper gaging nozzle will again be indicated on the gage. If the adjustment has been accurate, the gage should show a zero reading, the same reading as for the lower gaging nozzle. If a difference is still shown, further adjustment of restriction valve 38 may be required and valves 86 and 87 can be switched back and forth as required to double-check the balancing of the gaging head with respect to the strip. When the adjustment has been completed, all the valves in panel 71 will be returned to the normal gaging position shown in FIG. 8. While the adjustment was taking place, fluid under pressure through line 73 was being supplied from regulator C through line 37, through the restriction valve 38 to servo nozzle 67 through passage 68. Passage 36 places cylinder chamber 32 in parallel with the servo nozzle, thereby causing the back-pressure at the servo nozzle to act against piston 33 and urge it upwardly. After the adjustment of the gaging head, the back-pressure against piston 33 will cause the gaging head to be held in the adjusted, balanced position. However, if, due to change in roll pressure, speed of rolling or the like, the dynamic position of strip 12 should change with respect to the gaging nozzles, it will also change with respect to the servo nozzle. Assuming the position of the strip is raised as shown in FIG. 8, the strip will move closer to the servo nozzle thereby creating an increase in back-pressure at the servo nozzle with a resultant increase in pressure within cylinder chamber 32. The increase in pressure will act against piston 33 thereby raising the piston and screw 34 in contact therewith. As will be understood, the movement of screw 34 will raise the gaging head to again place the gaging head in a balanced position with respect to the strip. Conversely, if the strip should move further from servo nozzle 67, the back-pressure will drop as will the back-pressure in cylinder chamber 32. This will cause piston 33 to be lowered, thereby lowering the gaging head to again bring the gaging nozzles in a balanced position relative to the strip.

Once the gaging system has been adjusted for operation, it will continuously gage strip and constantly indicate the thickness of the strip and fluctuations thereof. If, at any time, it is desired to determine whether or not the servo circuit is maintaining the gaging nozzle in a balanced position, the proper switching of valves 85, 86 and 87 will give individual reading on gage 89, thereby indicating if the back-pressure at each of the gaging nozzles is the same.

As shown in FIGS. 1 and 8, gages 77 and 89 and regulators A, B and C can be mounted, for the sake of convenience, in a single cabinet indicated generally at 92 in FIGS. 1 and 8. As shown in FIG. 1, gage 77 can be calibrated with the zero at a limiting position on the dial while gage 89 is preferably calibrated with the zero at the center of the dial so that deflection, plus or minus, from the zero or optimum position may be easily read.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A non-contacting gage for gaging continuous strip comprising a base, nozzle support means swingably mounted to said base, a pair of oppositely disposed gaging nozzles adapted to receive the strip therebetween, a first gaging circuit connected to said gaging nozzles and including an indicator gage responsive to changes in pressure at the gaging nozzles, at least one servo nozzle carried by said nozzle support means proximate to said gaging nozzles and directed at the strip passing between said gaging nozzles, a second circuit connected to soid servo nozzle and means in said second circuit responsive to changes in pressure at said servo nozzle and acting between said base and said nozzle support means for moving said nozzle support means to maintain said gaging nozzles equidistant from the strip being gaged.

2. The structure defined in claim 1 wherein said means acting between said base and said nozzle support means comprises a cylinder mounted to said base, a piston slidably mounted in said cylinder, said piston and cylinder defining a chamber therebetween, said chamber communicating with said second circuit, and an arm connected between said piston and said nozzle support means to move said nozzle support means responsive to movement of said piston in said cylinder.

3. The structure defined in claim 2 wherein said arm is adjustably connected to said nozzle support means for manually adjusting the distance between said piston and the point of connection of said arm to said nozzle support means.

4. The structure defined in claim 2 wherein said second circuit comprises, in series with said servo nozzle, a source of fluid under pressure, a regulator for said fluid pressure, and a restriction valve for isolating said servo nozzle from said pressure, and a restriction valve for isolating said servo nozzle from said pressure regulator.

5. The structure defined in claim 4 wherein said cylinder communicates with said circuit between said restriction valve and said servo nozzle.

6. A non-contacting gage for gaging continuous strip comprising a pair of oppositely-disposed gaging nozzles adapted to receive the strip therebetween, a gaging circuit connected to said gaging nozzles and including an indicator gage responsive to changes in pressure at the gaging nozzles, means responsive to the position of the strip for determining the position of the strip with respect to at least one of said gaging nozzles and said last means including means for moving said gaging nozzles in unison to maintain said nozzles equidistant from the strip being gaged.

7. A non-contacting gage for gaging continuous strip comprising a base, nozzle support means swingably mounted to said base, a pair of oppositely disposed gaging nozzles carried by said nozzle support means, said gaging nozzles adapted to receive the strip therebetween, a gaging circuit connected to said gaging nozzles and including an indicator gage responsive to changes in pressure at the gaging nozzles, a servo nozzle carried by said nozzle support means proximate to one of said gaging nozzles said servo nozzle mounted substantially parallel to one of said gaging nozzles and directed at the strip passing between said gaging nozzles, and means acting between said base and said nozzle support means to move said nozzle support means responsive to changes in pressure at said servo nozzle to maintain said gaging nozzles equidistant from the strip being gaged.

8. A circuit for determining the balance between oppositely disposed gaging nozzles and the strip passing therebetween, comprising a first pressure line communicating at one end with one of said gaging nozzles, a second pressure line communicating at one end with the other of said gaging nozzles, a third pressure line communicating at one end with said first and second pressure lines, the other end of said third pressure line supplying fluid under pressure to said circuit, a fourth pressure line connected at one end to the junction between said first, second and third pressure lines, a pressure indicator gage communicating with said fourth pressure line at the other end thereof, and independent means in each of said first and second pressure lines to selectively isolate said lines from the junction with said other lines, whereby each of said gaging nozzles may be isolated from communication with said pressure indicator gage, said indicating means including an adjustable bleed valve communicating with said fourth pressure line and said independent means further including means for selectively isolating said bleed valve from said fourth pressure line.

9. A circuit for determining the balance between oppositely disposed gaging nozzles and the strip passing therebetween, comprising a first pressure line communicating at one end with one of said gaging nozzles, a second pressure line communicating at one end with the other of said gaging nozzles, a third pressure line communicating at one end with said first and second pressure lines, the other end of said third pressure line applying fluid under pressure to said circuit, a fourth pressure line connected at one end to the junction between said first, second and third pressure lines, a pressure indicator gage communicating with said fourth pressure line at the other end thereof, and independent means at each of said first and second pressure lines to selectively isolate said lines from the junction with said other lines, whereby each of said gaging nozzles may be isolated from communication with said pressure indicator gage, said independent means comprising a manually operable valve in each of said first and second lines to selectively open and close the passages in said lines, and said independent means further including a manually operable adjustable bleed valve, a manually operable selective valve, said adjustable bleed valve communicating with one side of said selective valve and the other of said selective valves communicating with said fourth pressure line whereby said adjustable bleed valve may be selectively isolated from said circuit regardless of the setting of said bleed valve.

10. A non-contacting gage for gaging continuous strip comprising a base, nozzle support means swingably mounted to said base, a pair of oppositely disposed gaging nozzles adapted to receive the strip therebetween, a gaging circuit connected to said gaging nozzles and including an indicator gage responsive to changes in pressure at the gaging nozzles, a servo nozzle carried by said nozzle support means proximate and substantially parallel to one of said gaging nozzles, and means acting between said base and said nozzle support means and responsive to the pressure at said servo nozzle for moving said gaging nozzles in unison to maintain the position of said gaging nozzles relative to the strip being gaged, said gaging circuit including a pair of valves, one of said valves adapted to selectively isolate one of said gaging nozzles from the circuit, and the other of said valves adapted to selectively isolate the other of said gaging nozzles from said circuit whereby the pressure at each of said gaging nozzles may be checked on said indicator gage.

11. In a non-contacting gage for gaging continuous strip having a pair of oppositely disposed gaging nozzles, means to measure the distance between the opposed nozzles comprising a separate gaging circuit including a pilot nozzle and anvil positioned beneath said pilot nozzle, said pilot nozzle being mounted at a known position with relation to one of said gaging nozzles, said anvil being mounted at a known position with relation to the other of said gaging nozzles, said separate gaging circuit including an indicator gage responsive to changes in pressure at the pilot nozzle caused by movement of said pilot nozzle toward and from a gage block of the known size positioned on said anvil, and said gage further including means for concurrently moving said pilot nozzle and the gaging nozzle associated therewith in a direction to move said gaging nozzle toward and from the other gaging nozzle.

12. A non-contacting gage for gaging continuous strip comprising a base, nozzle support means mounted on said base, a first gaging nozzle carried by said nozzle support means, a second gaging nozzle carried by said nozzle support means, said first and second gaging nozzles being oppositely disposed to receive the strip therebetween, a first gaging circuit including a pressure-responsive indicator gage associated with said first and second gaging nozzles, said second gaging nozzle being adjustably carried by said nozzle support means for adjustment toward and from said first gaging nozzle, a pilot nozzle carried by said second gaging nozzle for movement therewith, an anvil carried by said nozzle support means at a known position with relation to said first gaging nozzle, said pilot nozzle being disposed proximate to the surface of said anvil, said pilot nozzle adapted to move toward and from said anvil as said second gaging nozzle is adjusted toward and from said first gaging nozzle, and a second gaging circuit including a pressure-responsive indicator gage associated with said pilot nozzle for measuring the distance between said first and second gaging nozzles.

13. The structure defined in claim 12 and further including spring-biased means acting between said second gaging nozzle and said nozzle support means to urge said second gaging nozzle toward said first gaging nozzle and a collar threadedly engaging said second gaging nozzle and bearing against said nozzle support means for adjustably limiting the movement of said second gaging nozzle toward said first gaging nozzle under the urging of said spring biased means.

14. The structure defined in claim 13 wherein said collar is provided with a plurality of circumferentially spaced ratchet teeth and further including selectively operable means carried by said nozzle support means to engage one of said ratchet teeth to maintain said second gaging nozzle in an adjusted position.

15. Means for swingably carrying a gaging head with respect to a base, comprising a pair of upstanding supports carried by said base, said supports being positioned on opposite sides of said gaging head, a pivot rod extending between said supports and being pivoted at the ends thereof to said supports along the longitudinal axis of said rod, first and second arms extending laterally from said pivot rod, said first and second arms being disposed proximate to said supports, the arms being on opposite sides of the gaging head, said arms being pivoted at the outer end thereof to said gaging head, a third arm pivotally mounted between the ends thereof to one of said supports through the pivot of said rod to said support, means for securing said third arm to said associated support for preventing pivotal movement thereof, and a fourth arm pivoted at one end thereof to the outer end of said third arm and pivoted at the other end to said gaging head, said first, second and fourth arms being of equal length whereby the attitude of said gaging head relative to said third arm is maintained regardless of the rocking movement of said gaging head, and further including cam carrying means carried by one of said supports and cooperatively engaging said third arm to pivotally adjust the position of said third arm relative to said support.

16. A non-contacting gage for gaging continuous strip comprising a base, nozzle support means swingably mounted to said base, a pair of oppositely disposed gaging nozzles adapted to receive the strip therebetween, a first gaging circuit connected to said gaging nozzles and including an indicator gage responsive to changes in pressure at the gaging nozzles, a servo nozzle carried by said nozzle support means proximate to one of said gaging nozzles, a second circuit connected to said servo nozzle, means in said second circuit connected to said servo nozzle and means in said second circuit responsive to changes in pressure at said servo nozzle and acting between said base and said nozzle support means for moving said nozzle support means to maintain said gaging nozzles equidistant from the strip being gaged, and means to measure the distance between the opposed gaging nozzles comprising a third gaging circuit including a pilot nozzle and an anvil positioned beneath said pilot nozzle, said pilot nozzle being mounted at a known position with relation to one of said gaging nozzles, said anvil being mounted at a known position with relation to the other of said gaging nozzles.

17. A non-contacting gage for gaging continuous strip comprising a base, nozzle support means mounted on said base, a first gaging nozzle carried by said nozzle support means, a second gaging nozzle carried by said nozzle support means, said first and second gaging nozzles being oppositely disposed to receive the strip therebetween, a first gaging circuit including a pressure-responsive indicator gage associated with said first and second gaging nozzles, said second gaging nozzle being adjustably carried by said nozzle support means for adjustment toward and from said first gaging nozzle, a pilot nozzle carried by said second gaging nozzle for movement therewith, an anvil carried by said nozzle support means at a known position with relation to said first gaging nozzle, said pilot nozzle being disposed proximate to the surface of said anvil, said pilot nozzle adapted to move toward and from said anvil as said second gaging nozzle is adjusted toward and from said first gaging nozzle, a second gaging circuit including a pressure-responsive indicator gage associated with said pilot nozzle for measuring the distance between said first and second gaging nozzles, a servo nozzle carried by said nozzle support means proximate to one of said gaging nozzles, a third circuit connected to said servo nozzle, and means in said third circuit responsive to changes in pressure at said servo nozzle and acting between said base and said nozzle support means for moving said nozzle support means to maintain said gaging nozzles equidistant from the strip being gaged.

18. The structure defined in claim 17 and further including valve means associated with each of said first and second gaging nozzles to selectively isolate one of said gaging nozzles from said first circuit for checking the pressure at the other of said gaging nozzles by means of said pressure-responsive indicator gage in said first gaging circuit to verify the balanced position of said gaging nozzles maintained by said servo nozzle and the circuit associated therewith.

19. A non-contacting gage for gaging strip material having substantially top and bottom portions, said gage comprising a pair of spaced gaging nozzles substantially opposite each other and adapted to receive the flat portions of the strip material therebetween, and means positioned adjacent to but not in contact with at least one flat portion of said strip material for detecting the proximity of one of said flat portions to at least one of said nozzles.

20. A non-contacting gage for gaging strip material having top and bottom substantially flat portions, said gage comprising a pair of oppositely spaced gaging nozzles adapted to receive the flat portions of the strip material therebetween, means positioned adjacent to but not in contact with at least one flat portion of said strip material for detecting the proximity of one of said flat portions to at least one of said nozzles, and means responsive to said last means for moving said nozzles in unison to keep said flat portions of said strip material substantially equidistant from said nozzles.

21. A gage for gaging strip material, having top and bottom substantially flat portions, said gage comprising a pair of oppositely spaced non-strip contacting gaging nozzles adapted to receive the flat portions of the strip material therebetween, and means positioned adjacent to but not in contact with at least one flat portion of said strip material and also adjacent to at least one of said nozzles for detecting the proximity of one of said flat portions of said strip material to at least one of said nozzles.

References Cited by the Examiner

UNITED STATES PATENTS

| | | | |
|---|---|---|---|
| 1,946,924 | 2/34 | Allen et al. | |
| 2,019,066 | 10/35 | Balsiger | 73—37.6 X |
| 2,259,472 | 10/41 | Johnson. | |
| 2,345,732 | 4/44 | Davies et al. | 73—37.6 |
| 2,438,696 | 3/48 | Fox et al. | 73—37.7 |

ISAAC LISANN, *Primary Examiner.*

UNITED STATES PATENT OFFICE
CERTIFICATE OF CORRECTION

Patent No. 3,213,671                          October 26, 1965

Charles A. Whitney et al.

It is hereby certified that error appears in the above numbered patent requiring correction and that the said Letters Patent should read as corrected below.

In the grant (only), line 1, for "Charles A. Whitnev" read -- Charles A. Whitney --; column 6, line 9, for "thorugh" read -- through --; column 7, line 2, for "FIG. 9" read -- FIG. 8 --; column 8, line 21, for "spid" read -- said --; lines 43 and 44, strike out "and a restriction valve for isolating said servo nozzle from said pressure,".

Signed and sealed this 17th day of May 1966.

(SEAL)
Attest:

ERNEST W. SWIDER                         EDWARD J. BRENNER
Attesting Officer                           Commissioner of Patents